United States Patent Office 3,605,179
Patented Sept. 20, 1971

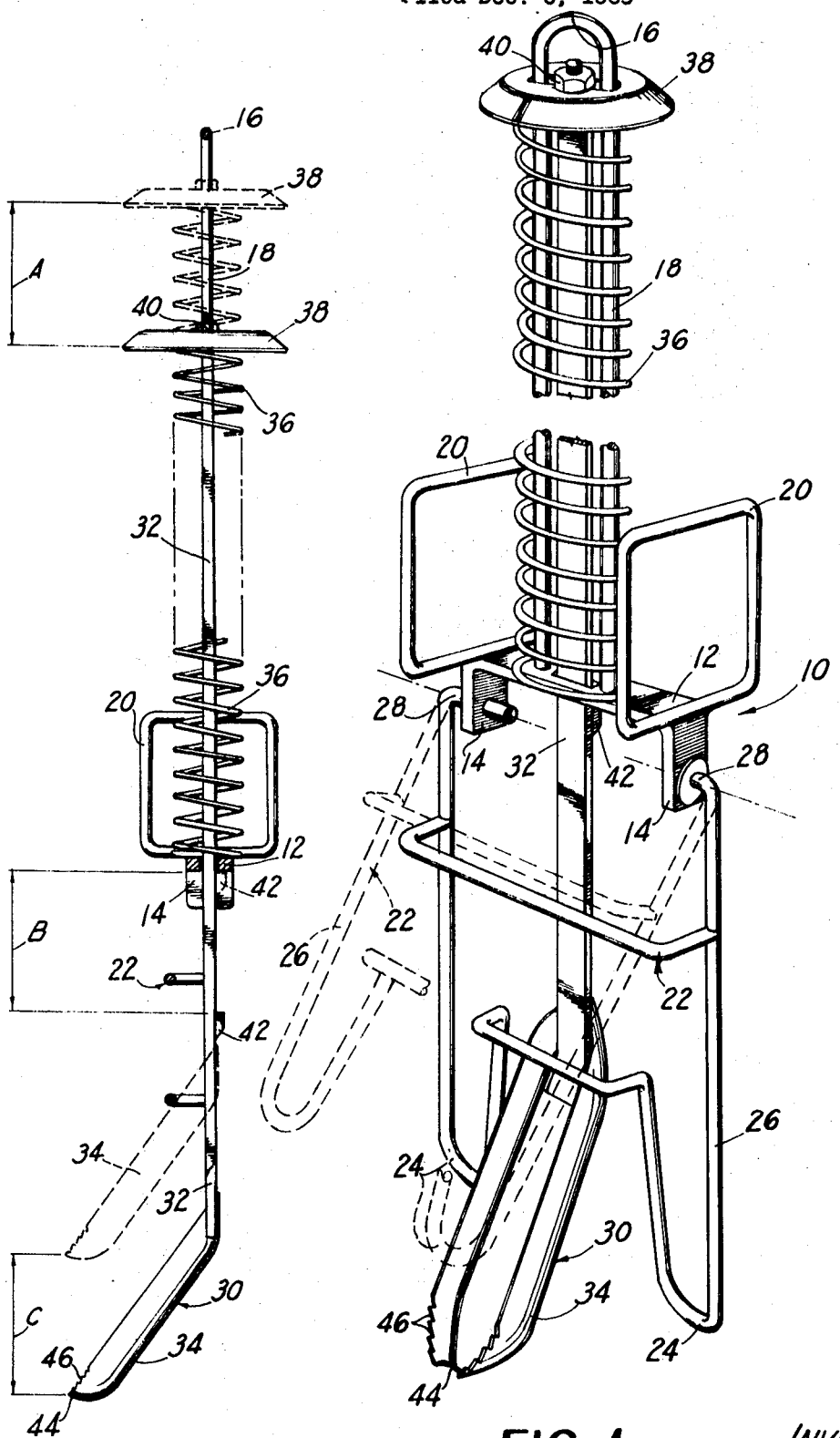

3,605,179
SHACKLE EVISCERATING MECHANISM
Grover S. Harben, Jr., Gainesville, Ga., assignor to
Gainesville Machine Company, Inc., Gainesville, Ga.
Filed Dec. 8, 1969, Ser. No. 883,201
Int. Cl. A22c 21/06
U.S. Cl. 17—11                                    10 Claims

ABSTRACT OF THE DISCLOSURE

A mechanism combining a shackle for supporting a chicken or other fowl in a head lowermost position and a spoon-shaped member movably disposed thereon in a reciprocable path for being inserted into the abdomen of a chicken or other fowl suspended from the shackle and for withdrawing the viscera from the chicken or other fowl. The bird is suspended by its hocks from a hock-gripping member pivotally mounted on the shackle. The spoon-shaped member is biased toward a retracted or withdrawn position and is provided with a rearwardly pointing serrated forward edge for permitting easy insertion into the bird, yet gripping or pulling the viscera upon spoon withdrawal.

SUMMARY OF THE INVENTION

Accordingly, it is an object of the present invention to provide an apparatus for supporting a chicken or other fowl in a head lowermost position and for automatically removing the viscera thereof as it is conveyed along a predetermined path.

Another object of the present invention is to provide a mechanism for supporting a chicken or other fowl being conveyed along a predetermined path and for automatically removing the viscera therefrom which does not transmit disease from one bird to any succeeding bird in the predetermined path.

Still another object of the present invention is to provide a combination shackle and viscera removal tool for quickly and efficiently removing the viscera from a chicken or other fowl as it is conveyed along a predetermined path of travel suspended therefrom in a head lowermost position.

According to one embodiment of the present invention the foregoing and other objects are attained by a device combining a shackle adapted to be conveyed along a predetermined path for supporting a chicken or other fowl in a head lowermost position as it is moved therealong and a special substantially spoon-shaped eviscerating tool movably disposed on the shackle for limited relative reciprocable movement therewith along a substantially vertical line perpendicular to the path of travel, which, upon movement in one direction, is inserted into a hole precut in the abdomen or the suspended bird between the viscera and the keel bone and upon movement in the other direction is withdrawn therefrom, whereby the viscera is pulled out as the spoon-shaped tool is dragged across the inside of the back of the bird.

BACKGROUND OF THE INVENTION

This invention relates generally to the processing of poultry and more particularly to a novel shackle and viscera removal tool combination for supporting a chicken or other fowl in a head lowermost position and for removing the viscera from the chicken or other fowl while it is being conveyed along a predetermined path of travel.

In the processing of chickens and other fowl, it is necessary, after killing and defeathering the chicken or other fowl, to remove the heart, lungs, gizzard, liver, and intestines comprising the viscera from the bird. Under federal laws regulating the processing of poultry being introduced into interstate commerce, inspection of the viscera of each chicken or other fowl is required to determine that the bird is free of disease and for this purpose the viscera of each chicken or other fowl must retain its identity with the bird from which it has been withdrawn.

Thus, it has become common practice, upon removing the viscera, to transport the chicken or other fowl past an inspection station with the viscera hanging suspended from the rear end of the bird. Heretofore, the viscera removal operation has been performed manually by holding the bird with one hand while inserting the other hand through an opening precut in the abdomen of the bird, lightly gripping the viscera and with a gentle twisting motion, removing the viscera therefrom. In addition to being slow, this method has also proven to be time consuming and costly to the poultry processor, for not only must a bird found to be diseased be removed from the conveyor, but also all the birds subsequently touched by the person removing the viscera which may have been contaminated thereby before the hands of the person have been washed or the gloves thereof changed.

BRIEF DESCRIPTION OF THE DRAWING

Still other objects and many of the attendant advantages and features of the present invention will be readily appreciated as the same becomes better understood from the following detailed description when considered in connection with the accompanying drawing, wherein like or corresponding parts are designated throughout the several views by like reference numerals and in which:

FIG. 1 is a perspective view with phantom lines indicating the free pivotal motion of the lower portion of the shackle member; and, FIG. 2 is a side elevational cross-section showing the spoon-shaped eviscerator tool in the compressed or extended position, with phantom lines indicating the normal relaxed position thereof, and the configurative relation of the spoon portion of the tool to the shackle.

DESCRIPTION OF A PREFERRED EMBODIMENT

Referring now to the drawing, there is shown a shackle member generally indicated by the reference numeral 10 for supporting a chicken or other fowl and comprising a centrally located substantially U-shaped bracket 12 having an elongated base and normally downward pointing legs 14 and another U-shaped support element 16, the elongate legs 18 of which also point downwardly and are secured at the ends thereof to the upper surface of the base of the bracket 12 by welding or the like. A pair of rod-like structures or guides 20 bent substantially into the configuration of squares are attached along one side thereof to the upper surface of the base of the bracket 12 outside the connections thereto of legs 18 along the edges thereof from which the legs 14 extend, also by welding or the like, and are disposed thereon such that the guides 20 are substantially perpendicular to the base 12. Pivotally disposed on the bracket 12 is a support 22 for a chicken or other fowl disposed below the bracket 12 and having a pair of U-shaped hock-gripping elements 24 into which the hocks of a chicken or other fowl may be compressed or clamped whereby the bird may be suspended therefrom in a head lowermost position. Rod-like extensions 26 of the hock-gripping elements 24 lie in planes parallel to those of the legs 14 of the bracket 12 and are provided with short right-angled projections 28 which pass through apertures in the legs 14 and thereby provide pivotal movement therein of the support 22 and of the chicken or other fowl suspended therefrom.

The viscera removal tool is generally indicated by the reference numeral 30 and comprises an elongated arm 32 to one end of which is secured a spoon-shaped viscera removal member 34 by welding or the like and the other end of which is passed through an aperture centrally disposed in the base of the U-shaped bracket 12 between the points of connection thereto of the legs 18 of the shackle support element 16. A coil spring 36 is positioned about the arm 32 and the legs 18 of the support 16 and is compressed against the base of the bracket 12 by an inverted substantially saucer-shaped member 38 having a diametrical slot therein through which are received the U-shaped support 16 and the threaded end of the arm 32, a bolt 40 being secured to the threaded end of the arm 32 for maintaining the saucer member 38 thereon. Movement of the arm 32 and the saucer 38 secured thereto along a line of motion coaxial with the saucer under the urging of the stored energy of the spring 36 is limited by a return stop element 42 secured to the arm 32 on the portion thereof disposed on the spoon side of the bracket 12 and which, being unable to pass through the aperture in the bracket base, abuts the underside of the bracket base upon movement vertically of the arm 32 thereby preventing further movement thereof. The spoon 34 is angularly oriented with respect to the arm 32 to which it is secured and is provided at its forward end with a notched-out portion 44 on either side of which there are serrations 46 on the spoon edge pointing rearwardly of the spoon for a purpose to be hereinafter set forth.

Operatively, the device of the present invention is particularly adapted for use with conveyor systems in poultry processing plants which are the subjects of other copending applications, namely, application Ser. No. 695,449 filed Jan. 3, 1968, by Grover S. Harben, Jr., and application Ser. No. 883,169, filed Dec. 8, 1969 by Grover S. Harben, Jr., but may be useful in other systems as well. According to such systems in general, the U-shaped support element 16 is secured to a conveyor means which transports the shackle through a predetermined path of travel with the chicken or other fowl suspended in a head lowermost position from the hock-gripping clamps 24. At a given point in this path of travel, the shackle is engaged by some form of camming means for forcing the saucer 38 downward against the spring 36 while the bird is oriented towards a horizontal position with the breast facing downwardly, whereby the spoon 34 is pushed down into a hole precut in the abdomen of the bird between the viscera and the breast and keel bone. Because the serrations 46 point rearwardly on the spoon, they offer no hindrance and the spoon slides easily into the bird. Referring to FIG. 2, it may be appreciated that with the arrangement of the viscera removal tool 30 set forth herein, such camming that will move the saucer 38 through a distance A from its original position relative to the top of the support 16 will also effect movement of the return stop 42 on the arm 32 through a distance B from the bracket 12 and of the spoon 34 through a distance C relative to the shackle and any bird suspended therefrom, the distances A, B, and C all being equal.

Subsequently, the bird is oriented towards an opposite position wherein it is inclined with the back thereof facing downwardly and simultaneously the camming action on the shackle 10 is slowly reversed, thereby permitting the spoon 34 to be withdrawn from the bird by the spring 36. In this position, however, the spoon 34 is dragged across the inside of the back of the bird for removing the viscera therefrom, the sharp serrated edges 46 now pointing with the direction of travel of the spoon for aiding in gripping and pulling out the lungs.

In orienting the bird to the proper positions for facilitating the insertion and withdrawal of the spoon 34, the pivotal shackle support 22 is extremely important, providing not only support for the bird but also allowing freedom of motion as necessary to achieve maximum performance. While such freedom of movement of the bird is desirable, however, the spoon must be kept to operate in a substantially vertical path. The conveyor systems generally include guide bars between which the square guides 20 may pass for thereby maintaining the viscera removal tool portion 30 of the device relatively free of sidewise motion.

Obviously, many modifications and variations of the present invention are possible in the light of the above teachings. It is therefore to be understood that within the scope of the appended claims, the invention may be practiced otherwise than as specifically described herein.

What is claimed is:

1. A mechanism for use in a poultry processing conveyor line comprising, in combination:
 a shackle for supporting a chicken or other fowl therefrom in a head lowermost position; and,
 an eviscerating tool disposed on said shackle and movable along a given line with respect thereto for insertion into a hole precut in the abdomen of the chicken or other fowl suspended from said shackle between the viscera and the keel bone and for removing the viscera upon withdrawal of said tool;
 whereby the viscera may be left hanging from the rear end of the chicken or other fowl for ready inspection thereof.

2. The mechanism set forth in claim 1, further including:
 means disposed on said shackle for normally urging said tool toward a retracted or withdrawn position,
 so that upon application of a force thereagainst the tool may be inserted into the chicken or other fowl and upon release of such force application the tool is automatically withdrawn by said urging means.

3. The mechanism set forth in claim 2, wherein:
 said urging means comprises a coil spring engaged between the shackle and one end of said tool.

4. The mechanism set forth in claim 3, further including:
 stop means on said tool and cooperable wtih said shackle for limiting the movement of said tool along said given line in the direction of withdrawal by said urging means.

5. The mechanism set forth in claim 1, wherein said shackle comprises:
 a support having means at one end thereof for securing said shackle to a conveyor system for movement in a given path; and
 a hock-gripping member pivotally mounted on the other end of said support for suspending said chicken or other fowl by the hocks thereof,
 so that said chicken or other fowl may be pivotally oriented with respect to said given line of movement of said eviscerating tool.

6. The mechanism set forth in claim 5, further including:
 guide means on said support of said shackle cooperable with said conveyor system for maintaining said support and said tool substantially within a given plane, while permitting pivotal movement of said hock-gripping member with respect thereto.

7. The mechanism set forth in claim 5, wherein said tool comprises:
 an elongated element having a spoon-shaped member at one end thereof disposed intermediate said hock-gripping member,
 said spoon-shaped member being angularly oriented from said elongated element and having a serrated forward edge.

8. The mechanism set forth in claim 7, wherein:
 the serrations on the forward edge of said spoon point rearwardly thereof and said spoon-shaped member is provided with a notched-out portion at the forward end thereof intermediate said serrations.

9. The mechanism set forth in claim 7, further including:
 spring means disposed between said support and the other end of said elongated element for normally urging said elongated element and said spoon-shaped member toward a retracted or withdrawn position; and, whereby upon application of a force against the other end of said elongated element of said tool, the tool may be moved along said given line and inserted into the chicken or other fowl, and upon release of such force applied thereagainst the tool is automatically withdrawn by said spring means.

10. A poultry shackle including means for supporting fowl by the hocks thereof; and, means carried by said shackle for eviscerating fowl suspended by said shackle.

References Cited
UNITED STATES PATENTS

| | | | |
|---|---|---|---|
| 1,986,195 | 1/1935 | Griffin | 17—11 |
| 2,605,496 | 8/1952 | Spang | 17—11 |
| 3,162,892 | 12/1964 | Fox | 17—11 |
| 3,474,492 | 10/1969 | Viscolosi | 17—11X |
| 3,510,907 | 5/1970 | Ressa et al. | 17—11 |

LUCIE H. LAUDENSLAGER, Primary Examiner

U.S. Cl. X.R.

17—44.1